United States Patent
Stokman et al.

(10) Patent No.: US 11,443,557 B2
(45) Date of Patent: Sep. 13, 2022

(54) MONITORING AND ANALYZING BODY LANGUAGE WITH MACHINE LEARNING, USING ARTIFICIAL INTELLIGENCE SYSTEMS FOR IMPROVING INTERACTION BETWEEN HUMANS, AND HUMANS AND ROBOTS

(71) Applicant: KEPLER VISION TECHNOLOGIES B.V., Amsterdam (NL)

(72) Inventors: Henricus Meinardus Gerardus Stokman, Amsterdam (NL); Marc Jean Baptist Van Oldenborgh, Amsterdam (NL); Fares Alnajar, Amsterdam (NL)

(73) Assignee: KEPLER VISION TECHNOLOGIES B.V., Amsterdam (NL)

( * ) Notice: Subject to any disclaimer, the term of this patent is extended or adjusted under 35 U.S.C. 154(b) by 173 days.

(21) Appl. No.: 16/956,485

(22) PCT Filed: May 24, 2019

(86) PCT No.: PCT/NL2019/050301
§ 371 (c)(1),
(2) Date: Jun. 19, 2020

(87) PCT Pub. No.: WO2019/226051
PCT Pub. Date: Nov. 28, 2019

(65) Prior Publication Data
US 2021/0097267 A1     Apr. 1, 2021

(30) Foreign Application Priority Data

May 25, 2018 (NL) ...................................... 2020989
May 28, 2018 (NL) ...................................... 2020996

(51) Int. Cl.
   G06V 40/20    (2022.01)
   G06T 7/70     (2017.01)
   G06N 20/00    (2019.01)

(52) U.S. Cl.
   CPC ............. *G06V 40/28* (2022.01); *G06N 20/00* (2019.01); *G06T 7/70* (2017.01);
   (Continued)

(58) Field of Classification Search
   CPC .... G06V 40/28; G06V 2201/07; G06V 40/20; G06N 20/00; G06T 7/70;
   (Continued)

(56) References Cited

U.S. PATENT DOCUMENTS

2010/0257462 A1* 10/2010 Barrett .................... H04N 7/147
                                                       715/756
2015/0120465 A1*  4/2015 Baldwin ............. H04L 63/0861
                                                       705/14.67

(Continued)

OTHER PUBLICATIONS

Kaihao et al, ("Facial Expression Recognition based on Deep Evolutional Spatial-Temporal Networks", IEEE Transactions on image processing, vol. 26, No. 9, Sep. 2017) (Year: 2017).*

(Continued)

*Primary Examiner* — Amara Abdi
(74) *Attorney, Agent, or Firm* — AEON Law, PLLC; Adam L. K. Philipp; David V. H. Cohen

(57) ABSTRACT

A body language system for determining a body language message of a living being in a context comprising an artificial intelligence system, said AI system running a computer program that: retrieves an image of said living being showing body language; labels said living being in said image, resulting in a labeled living being; determines said context from said image using a trained machine learning model; determines a baseline body language of said labeled living being from said image using a trained (Continued)

machine learning model; adapts a trained machine learning model of said AI system using said baseline body language and said context; applies the adapted trained machine learning model of said AI system to the one image for categorizing said body language resulting in a category, and applying said category for determining said body language message.

21 Claims, 10 Drawing Sheets

(52) U.S. Cl.
CPC ............... *G06T 2207/10016* (2013.01); *G06T 2207/20076* (2013.01); *G06T 2207/30196* (2013.01); *G06V 2201/07* (2022.01)

(58) Field of Classification Search
CPC . G06T 2207/10016; G06T 2207/20076; G06T 2207/30196
See application file for complete search history.

(56) References Cited

U.S. PATENT DOCUMENTS

| | | | | |
|---|---|---|---|---|
| 2017/0124407 | A1* | 5/2017 | Micks | G06V 10/50 |
| 2017/0205888 | A1* | 7/2017 | Nicholson | G06F 40/103 |
| 2017/0319123 | A1* | 11/2017 | Voss | A61B 5/6803 |

OTHER PUBLICATIONS

Sidney et al., ("Automatic detection of learners affect from Gross body language", 2009, pp. 123-150) (Year: 2009).*

"Automatic Error Analysis of Human Motor Performance for Interactive Coaching in Virtual Reality", Sep. 2017, by Felix Hülsmann et al.

"Embedded Real-Time Fall Detection Using Deep Learning For Elderly Care", Nov. 2017, by Hyunwoo Lee et al.

"Learning a bidirectional mapping between human whole-body motion and natural language using deep recurrent neural networks", May 2017, by Matthias Plappert et al.

"Learning Personalized Models for Facial Expression Analysis and Gesture Recognition", Jan. 2016, by Gloria Zen et al.

"Survey on Emotional Body Gesture Recognition", Jan. 2018, by Fatemeh Noroozi et al.

"Video in Sentences Out", Aug. 2014, by Andrei Barbu et al.

Rehrl, T et al: "Multiple Parallel Vision-Based Recognition in a Real-Time Framework for Human-Robot-Interaction Scenarios", Third International Conference on Advances in Computer-Human Interactions, 2010. ACHI '10., IEEE, Piscataway, NJ, USA, Feb. 10, 2010 (Feb. 10, 2010), pp. 50-55.

Morency et al, "Head gestures for perceptual interfaces: The role of context in improving recognition", Artificial Intelligence, Elsevier Science Publisher B.V., Amsterdam, NL, vol. 171, No. 8-9, May 31, 2007 (May 31, 2007), p. 568-585, XP022099990.

Mariska Esther Kret et al, "Social context influences recognition of bodily expressions", Experimental Brain Research, Springer, Berlin, DE,vol. 203, No. 1, Apr. 17, 2010 (Apr. 17, 2010), p. 169-180, XP019839888.

Castellano Ginevra et al, "Detecting perceived quality of interaction with a robot using contextual features", Jul. 8, 2016 (Jul. 8, 2016), vol. 41, No. 5, p. 1245-1261, XP036203827.

Alejandro Jaimes et al, "Multimodal Human Computer Interaction: A Survey : ICCV 2005 Workshop on HCI, Beijing, China, Oct. 21, 2005. Proceedings", "Serious Games", p. 1-15, Jan. 1, 2005 (Jan. 1, 2005), ChamSpringer International Publishing, XP055623017.

* cited by examiner

MONITORING AND ANALYZING BODY LANGUAGE WITH MACHINE LEARNING, USING ARTIFICIAL INTELLIGENCE SYSTEMS FOR IMPROVING INTERACTION BETWEEN HUMANS, AND HUMANS AND ROBOTS

FIELD OF THE INVENTION

The invention relates to a body language system, a sign language transformation system, a command gesture language transformation system, a spoken-language transformation system, and a computer program product for controlling an AI system.

BACKGROUND OF THE INVENTION

Artificial intelligence (AI) is developing rapidly and AI applications are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

Human-machine communication becomes more and more important. Machines (such as computers, smartphones, tablets and robots) are penetrating society rapidly. Research reveals that communication between humans for a major part is depending on body language. Therefore understanding body language would not only enhance communications between humans but also between humans and machines. More general, the ability to understanding body language of living beings will improve the communication between living beings, and between living beings and machines. Machine learning can be used to understand and evaluate body language.

In "Survey on Emotional Body Gesture Recognition", January 2018, by Fatemeh Noroozi et al. (https://arxiv.org/abs/1801.07481) according to its abstract describes "Automatic emotion recognition has become a trending research topic in the past decade. While works based on facial expressions or speech abound, recognizing affect from body gestures remains a less explored topic. We present a new comprehensive survey hoping to boost research in the field. We first introduce emotional body gestures as a component of what is commonly known as "body language" and comment general aspects as gender differences and culture dependence. We then define a complete framework for automatic emotional body gesture recognition. We introduce person detection and comment static and dynamic body pose estimation methods both in RGB and 3D. We then comment the recent literature related to representation learning and emotion recognition from images of emotionally expressive gestures. We also discuss multi-modal approaches that combine speech or face with body gestures for improved emotion recognition. While pre-processing methodologies (e.g. human detection and pose estimation) are nowadays mature technologies fully developed for robust large scale analysis, we show that for emotion recognition the quantity of labelled data is scarce, there is no agreement on clearly defined output spaces and the representations are shallow and largely based on naive geometrical representations."

In "Learning Personalized Models for Facial Expression Analysis and Gesture Recognition", January 2016, by Gloria Zen et al. (https://ieeexplore.ieee.org/abstract/document/7394167) according to its abstract describes "Facial expression and gesture recognition algorithms are key enabling technologies for human-computer interaction (HCI) systems. State of the art approaches for automatic detection of body movements and analyzing emotions from facial features heavily rely on advanced machine learning algorithms Most of these methods are designed for the average user, but the assumption "one-size-fits-all" ignores diversity in cultural background, gender, ethnicity, and personal behavior, and limits their applicability in real-world scenarios. A possible solution is to build personalized interfaces, which practically implies learning person-specific classifiers and usually collecting a significant amount of labeled samples for each novel user. As data annotation is a tedious and time-consuming process, in this paper we present a framework for personalizing classification models which does not require labeled target data. Personalization is achieved by devising a novel transfer learning approach. Specifically, we propose a regression framework which exploits auxiliary (source) annotated data to learn the relation between person-specific sample distributions and parameters of the corresponding classifiers. Then, when considering a new target user, the classification model is computed by simply feeding the associated (unlabeled) sample distribution into the learned regression function. We evaluate the proposed approach in different applications: pain recognition and action unit detection using visual data and gestures classification using inertial measurements, demonstrating the generality of our method with respect to different input data types and basic classifiers. We also show the advantages of our approach in terms of accuracy and computational time both with respect to user-independent approaches and to previous personalization techniques"

In "Automatic Error Analysis of Human Motor Performance for Interactive Coaching in Virtual Reality", September 2017, by Felix Hülsmann et al. (https://arxiv.org/abs/1709.09131) according to its abstract describes "In the context of fitness coaching or for rehabilitation purposes, the motor actions of a human participant must be observed and analyzed for errors in order to provide effective feedback. This task is normally carried out by human coaches, and it needs to be solved automatically in technical applications that are to provide automatic coaching (e.g. training environments in VR). However, most coaching systems only provide coarse information on movement quality, such as a scalar value per body part that describes the overall deviation from the correct movement. Further, they are often limited to static body postures or rather simple movements of single body parts. While there are many approaches to distinguish between different types of movements (e.g., between walking and jumping), the detection of more subtle errors in a motor performance is less investigated. We propose a novel approach to classify errors in sports or rehabilitation exercises such that feedback can be delivered in a rapid and detailed manner: Homogeneous sub-sequences of exercises are first temporally aligned via Dynamic Time Warping. Next, we extract a feature vector from the aligned sequences, which serves as a basis for feature selection using Random Forests. The selected features are used as input for Support Vector Machines, which finally classify the movement errors. We compare our algorithm to a well established state-of-the-art approach in time series classification, 1-Nearest Neighbor combined with Dynamic Time Warping, and show our algorithm's superiority regarding classification quality as well as computational cost."

WO 2017/218595 according to its abstract describes "A method or system is capable of detecting operator behavior ("OB") utilizing a virtuous cycle containing sensors, machine learning center ("MLC"), and cloud based network ("CBN"). In one aspect, the process monitors operator body language captured by interior sensors and captures surrounding information observed by exterior sensors onboard a vehicle as the vehicle is in motion. After selectively recording the captured data in accordance with an OB model generated by MLC, an abnormal OB ("AOB") is detected in accordance with vehicular status signals received by the OB model. Upon rewinding recorded operator body language and the surrounding information lea ding up to detection of AOB, labeled data associated with AOB is generated. The labeled data is subsequently uploaded to CBN for facilitating OB model training at MLC via a virtuous cycle."

US2018082112 according to its abstract describes "A system and method are presented for body language analysis of a video interaction. In a contact center system, the video interaction between an agent and a customer may be monitored and used to determine automatic actions when threshold are met and/or matches are made. Training videos comprising determined metrics may be used for comparison to real-time interactions. Scoring and/or matches may be utilized to determine a threshold to trigger pre-determined actions based on comparison to the training videos."

In "Learning a bidirectional mapping between human whole-body motion and natural language using deep recurrent neural networks", May 2017, by Matthias Plappert et al. (https://arxiv.org/abs/1705.06400) according to its abstract describes "Linking human whole-body motion and natural language is of great interest for the generation of semantic representations of observed human behaviors as well as for the generation of robot behaviors based on natural language input. While there has been a large body of research in this area, most approaches that exist today require a symbolic representation of motions (e.g. in the form of motion primitives), which have to be defined a-priori or require complex segmentation algorithms. In contrast, recent advances in the field of neural networks and especially deep learning have demonstrated that sub-symbolic representations that can be learned end-to-end usually outperform more traditional approaches, for applications such as machine translation. In this paper we propose a generative model that learns a bidirectional mapping between human whole-body motion and natural language using deep recurrent neural networks (RNNs) and sequence-to-sequence learning. Our approach does not require any segmentation or manual feature engineering and learns a distributed representation, which is shared for all motions and descriptions. We evaluate our approach on 2,846 human whole-body motions and 6,187 natural language descriptions thereof from the KIT Motion-Language Dataset. Our results clearly demonstrate the effectiveness of the proposed model: We show that our model generates a wide variety of realistic motions only from descriptions thereof in form of a single sentence. Conversely, our model is also capable of generating correct and detailed natural language descriptions from human motions."

U.S. Pat. No. 8,098,273 according to its abstract describes "In one embodiment, a method determines an indication of a mood for a caller during a service call. The mood may be determined using a facial analysis of the caller's facial expressions. The mood may indicate an emotion of the user, such as the user is angry, happy, etc. The mood may be determined based on a facial expression analysis of the caller during a portion of the service call. The service call may be a call between the caller and a service center, which may provide customer support to a caller for a product, service, etc. One example of a service center may be video contact service center that enables video calls with a caller. An action is then determined based on analysis of the mood invoked during a portion of the call. Once the action is determined, the action may be performed."

US2017124407 according to its abstract describes "Systems, methods, and devices for predicting driver intent and future movements of a human driven vehicles are disclosed herein. A system for predicting future movements of a vehicle includes a camera system, a boundary component, a body language component, and a prediction component. The camera system is configured to capture an image of a vehicle. The boundary component is configured to identify a sub-portion of the image corresponding to an area where a driver of a vehicle is located. The body language component configured to detect a driver's body language. The prediction component configured to predict future motion of the vehicle based on the driver's body language detected by the body language component."

US2015120465 according to its abstract describes "Concepts and technologies are disclosed herein for detecting body language via bone conduction. According to one aspect, a device can detect body language of a user. The device can generate a signal and send the signal to a sensor network connected to a user. The device can receive a modified signal from the sensor network and compare the modified signal to a body language reference model. The device can determine the body language of the user based upon comparing the modified signal to the body language reference model."

In "Embedded Real-Time Fall Detection Using Deep Learning For Elderly Care", November 2017, by Hyunwoo Lee et al. (https://arxiv.org/abs/1711.11200) according to its abstract describes "This paper proposes a real-time embedded fall detection system using a DVS (Dynamic Vision Sensor) that has never been used for traditional fall detection, a dataset for fall detection using that, and a DVS-TN (DVS-Temporal Network). The first contribution is building a DVS Falls Dataset, which made our network to recognize a much greater variety of falls than the existing datasets that existed before and solved privacy issues using the DVS. Secondly, we introduce the DVS-TN:optimized deep learning network to detect falls using DVS. Finally, we implemented a fall detection system which can run on low-computing H/W with real-time, and tested on DVS Falls Dataset that takes into account various falls situations. Our approach achieved 95.5% on the F1-score and operates at 31.25 FPS on NVIDIA Jetson TX1 board."

In "Video In Sentences Out", August 2014, by Andrei Barbu et al. (https://arxiv.org/abs/1408.6418) according to its abstract describes "We present a system that produces sentential descriptions of video: who did what to whom, and where and how they did it. Action class is rendered as a verb, participant objects as noun phrases, properties of those objects as adjectival modifiers in those noun phrases, spatial relations between those participants as prepositional phrases, and characteristics of the event as prepositional-phrase adjuncts and adverbial modifiers. Extracting the information needed to render these linguistic entities requires an approach to event recognition that recovers object tracks, the track-to-role assignments, and changing body posture."

US2013077820 according to its abstract describes "A virtual skeleton includes a plurality of joints and provides a machine readable representation of a human subject observed with a sensor such as a depth camera. A gesture detection module is trained via machine learning to identify one or more features of a virtual skeleton and indicate if the feature(s) collectively indicate a particular gesture."

US2017319123 according to its abstract describes "Behavioral and mental health therapy systems in accordance with several embodiments of the invention include a wearable camera and/or a variety of sensors (accelerometer, microphone, among various other) connected to a computing system including a display, audio output, holographic output, and/or vibrotactile output to automatically recognize social cues from images captured by at least one camera and provide this information to the wearer via one or more outputs such as (but not limited to) displaying an image, displaying a holographic overlay, generating an audible signal, and/or generating a vibration."

REHRL, T ET AL: "Multiple Parallel Vision-Based Recognition in a Real-Time Framework for Human-Robot-Interaction Scenarios", THIRD INTERNATIONAL CONFERENCE ON ADVANCES IN COMPUTER-HUMAN INTERACTIONS, 2010. ACHI '10, IEEE, PISCATAWAY, N.J., USA, 10 Feb. 2010 (2010-02-10), pages 50-55, according to its abstract describes "Everyday human communication relies on a large number of different communication mechanisms like spoken language, facial expressions, body pose and gestures, allowing humans to pass large amounts of information in short time. In contrast, traditional human-machine communication is often unintuitive and requires specifically trained personal. In this paper, we present a real-time capable framework that recognizes traditional visual human communication signals in order to establish a more intuitive human-machine interaction. Humans rely on the interaction partner's face for identification, which helps them to adapt to the interaction partner and utilize context information. Head gestures (head nodding and head shaking) are a convenient way to show agreement or disagreement. Facial expressions give evidence about the interaction partners' emotional state and hand gestures are a fast way of passing simple commands The recognition of all interaction queues is performed in parallel, enabled by a shared memory implementation."

SUMMARY OF THE INVENTION

The invention allows an apparatus or device or system to understand the body language of living beings with an AI system, and to improve for instance response of decision-making using such understanding.

To that end, there is provided a body language system for determining a body language message of a living being in a context, said system comprising an artificial intelligence (AI) system, said AI system running a computer program that:
  retrieves at least one image of said living being showing body language;
  labels said living being in said at least one image, resulting in a labeled living being;
  determines said context from said at least one image using a trained machine learning model;
  determines a baseline body language of said labeled living being from said at least one image using a trained machine learning model;
  adapts a trained machine learning model of said AI system using said baseline body language and said context;
  applies the adapted trained machine learning model of said AI system to at least one of said at least one image for categorizing said body language resulting in a category, and applying said category for determining said body language message.

There is further provided a sign language transformation system comprises the body language system, said sign language transformation system for transforming sign language into a computer-processable sign language message, said sign language transformation system comprising an AI system running a sign language computer program for retrieving at least one image of said living being showing sign language and applying said AI system for transforming said sign language into said sign language message, said computer program of said body language system determining a body language message from said at least one image for validating said sign language message.

There is further provided a command gesture language transformation system comprises the body language system, said command gesture language transformation system for transforming command gesture language into a command gesture language message, said command gesture language transformation system comprising an AI system running a command gesture language computer program for retrieving at least one image of said living being showing command gesture language and applying said AI system for transforming said command gesture language into said command gesture language message, said computer program of said body language system determining a body language message from said at least one image for validating said command gesture language message.

There is further provided a spoken-language transformation system comprises the body language system, said spoken-language transformation system for transforming spoken-language into a spoken-language message, said spoken-language transformation system comprising an AI system running a spoken-language computer program for retrieving a spoken-language recording of said labeled living being and applying said AI system for transforming said spoken-language recording into said spoken-language message, wherein said at least one image is time-synchronized with said spoken-language recording, and said computer program of said body language system determining a body language message from said at least one image for validating said spoken-language message.

There is further provided a computer program product for controlling an AI system, said computer program product when running on a data processor:
  retrieves at least one image of said living being showing body language;
  labels said living being in said at least one image, resulting in a labeled living being;
  determines a baseline body language of said labeled living being;
  adapts an AI system using said baseline body language;
  applies said adapted AI system to at least one of said at least one image for categorizing said body language resulting in a category, and applying said category for determining said body language message.

It was found that body language of a living being is best understood when taking into account the normal, i.e., a baseline body language.

Typically, body language is an involuntary and unconscious phenomenon that adds to the process of communication.

Body language comprises of movements and postures through which attitudes and feelings are communicated, such as "his intent was clearly expressed in his body language". In an embodiment, body language consists of these movements and postures.

Nonverbal communication can be by means of facial expressions, eye behavior, gestures, posture, and the like, and are often thought to be or supposed to be involuntary.

Body language is a type of nonverbal communication in which physical behavior, as opposed to words, is used to express or convey information. Such behavior includes body posture, gestures, touch, breath, facial expressions, eye expression, mouth expression, the use of space and appearance.

Body language comprises touching and how it is used in communication, also referred to as haptic communication. As such, handshakes, holding hands, back slapping, high fives, brushing up against someone or patting someone, this all has meaning in the context of communication.

Body language also comprises spatial relationships, which is also known as "proxemics". Introduced by Edward T. Hall in 1966, proxemics is the study of measurable distances between people as they interact with one another.

Body language further comprises breathing. Patterns of breathing and the context wherein breathing is evaluated are indicative for the mood and state of mind of humans and in general living beings. As such, deep breathing can indicate a relaxed mood and shallow, excessive rapid breathing as being in a more anxious, nervous or stressed state of mind.

The baseline body language of a living being is the body language the live being is expected to show under normal circumstances, in everyday life. Everyday life comprises the ways in which living beings typically act, move, touch, breath, look, speak, think, and feel on a daily basis. Everyday life may be described as routine, natural, habitual, or normal.

The body language message is derived from an amount of deviation of body language of a living being from its baseline body language.

Adapting an AI system results in an AI system that is able to recognize body language that expresses a body language message. Adapting an AI system may comprise calibrating an AI system with a baseline body language.

A baseline body language can be set on a group level or on an individual level. On the group level, in an embodiment the body language system determines the common baseline body language for a group of living beings sharing a common aspect that is typical for the group.

A living being in the context of this application can be understood as a human or an animal. In an embodiment, an animal relates for instance domesticated animals or live stock. Examples of these animals are a dog, a cat, a horse, a cow, a sheep or a goat.

In an embodiment, an animal relates to a wild animal. Examples of wild animals are lions, zebra, elephants, fishes, penguins, birds.

The message in most case relates to a machine-processable message. Such a machine-processable message can be stored, or transformed in a format that can be presented to a human being. In most cases, the computer program provides the message in a machine-processable format.

In an embodiment, the computer program retrieves said at least one image of said living being, and wherein said body language comprises a body language pose.

In an embodiment, the computer program retrieves a plurality of images of said living being, and wherein said body language comprises a body language gesture, in particular said plurality of images is part of a time series of images.

In an embodiment, the at least one image is part of a time series of images. In an embodiment, a time series of images can comprise at least part of a movie.

In an embodiment, the after said adapting, said AI system is applied to further retrieved images of said living being.

In an embodiment, determining said body language message of a living being occurs substantially real-time, in an embodiment functionally real-time.

In an embodiment, the body language message is determined within a probability range.

On individual level, an embodiment of a body language system provided determination of the baseline body language per living being.

In an embodiment, determining said baseline body language comprises determining body language characteristics which are specific for a group of living beings including said identified living being.

In an embodiment, determining said baseline body language comprises retrieving information regarding said labeled living being, said information comprising at least one selected from species, culture, race, religion, appearance, state of mental health, state of physical health, and age group.

In an embodiment, retrieving information for said baseline body language regarding said labeled living being comprises categorizing said body language from said retrieved at least one image.

In an embodiment, a body language system provides recognition of groups of individuals and provides determination of a common baseline body language. Such a body language system can provide an estimation of a social tension within a group or between groups; for instance when two groups of football hooligans meet.

In another example, an embodiment of a body language system provides recognition of when people in a group are discussing, and provide determination of whether these people are likely to agree or disagree with each other. An example of agreement is when people are copying each other's body language. In such a case, these people often express mutual understanding.

In an embodiment, determining said baseline body language comprises determining body language details that are specific for said labeled living being.

In an embodiment, determining said baseline body language that are specific for said labeled living being comprises said computer program:
  retrieving at least one further image of said living being showing body language;
  labeling said living being an said at least one further image, resulting in said labeled living being;
  applying said AI system to said at least one further image for categorizing the body language of said labeled living being resulting in a category, and applying said category for determining said baseline body language.

In an embodiment, die at least one image comprises a plurality of living beings each showing said body language, and said computer program labeling at least part of said living beings in said at least one image, determining a common baseline body language of said labeled living beings, adapting said AI system using said common baseline body language.

In an embodiment hereof, the system further comprises using said common baseline body language for grouping said labeled living beings.

In an embodiment, the computer program further determines a context labeled living being.

In an embodiment the context is an environment in which a living being is positioned, in particular said environment is set by at least one selected from a location, an event, an object, another living being, weather conditions, light conditions, road conditions, and a combination thereof.

In an embodiment, the computer program retrieves said context from said at least one image.

In a further example, an embodiment of a body language system provides determination of a context of a living being. A context is an environment a living being is positioned in. For instance context may include information about the location, an event, an object, another living being, weather conditions, light conditions and road conditions. Answers to questions such as "Is the living being in a city or in the countryside?" (location), "Is the living being close to an accident?" (event), "Is the living close to a car?" (object), "Is the human near a dangerous animal?" (another living being), "Is the living standing in a storm?" (weather condition), "Is the living being walking in the night?" (light condition), and "Is the living being on a busy road, is the road a highway or is the road a pedestrian area?" (road condition) contribute to determine the context.

In an embodiment of the sign language transformation system, the validating comprises comparing said sign language message with said body language message and outputs a machine-processable result indicating either said body language message emphasizes said sign language, or said body language message de-emphasizes said sign language, or said body language message differs from said sign language message.

In an embodiment of the sign language transformation system:
said sign language computer program determines said sign language message within a probability range;
said sign language computer program of said body language system determines said body language message within a further probability range, and
wherein said validating comprises comparing said probability range with said further probability range.

Body language must not be confused with sign language or command gesture language. Sign languages are like spoken and written languages with grammar systems. Sign language can exhibit the fundamental properties that exist in all spoken and written languages. As command gesture languages are a set of well-defined gestures used to send a non-trivial command or non-trivial message to a machine or living being. Body language, on the other hand, does not have a grammar and must be interpreted broadly, instead of having an absolute meaning corresponding with a certain movement. Nevertheless, body language can emphasize, de-emphasize, or even alter a message of another type of language when used in parallel with the other type of language. For example, expressing an opinion in a spoken language while showing as body language a clenched fist, emphasizes the message of the opinion. In another example, a message such as "I hate him" in a sign language while showing as body language a big smile de-emphasizes the message, or even alters the message in "I love him". Body language is often complimentary to other types of language. Body language helps to put a message in the right context. For instance, understanding body language can differentiate a gesture as part of command gesture language from a gesture as part of body language. Such as the raising of an arm which can send a "stop" message as part of command gesture language or a "hello" message as part of body language.

In an embodiment of the command gesture language transformation system said validating comprises comparing said command gesture language message with said body language message and outputs a machine-processable result indicating either said body language message emphasizes said command gesture language, or said body language message de-emphasizes said command gesture language, or said body language message differs from said command gesture language message.

In an embodiment, of the spoken-language transformation system, the validating comprises comparing said spoken-language message with said body language message and outputs a machine-processable result indicating either said body language message emphasizes said spoken-language, or said body language message de-emphasizes said spoken-language, or said body language message differs from said spoken-language message.

In an embodiment of the spoken-language transformation system:
said spoken-language computer program determines said spoken-language message within a probability range;
said spoken-language computer program of said body language system determines said body language message within a further probability range, and wherein said validating comprises comparing said probability range with said further probability range.

In an embodiment of the command gesture language transformation system:
said command gesture language computer program determines said command gesture language message within a probability range;
said command gesture language computer program of said body language system determines said body language message within a further probability range, and wherein said validating comprises comparing said probability range with said further probability range.

In order to detect and localize a living being in a scene from a retrieved image an embodiment uses a method to detect living beings. Such a method will use machine learning techniques (mainly deep learning) to design and train a model which detects living beings given an input of the same type (RGB image, infrared, etc.) as the system perceives. The model is trained on a large amount of annotated data; it comprises images with and without living beings and locations of the living beings are annotated. In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize hand-crafted features (such as LBP, SIFT, or HOG) and conventional classification methods (such as SVM or Random Forest) can be used.

In an embodiment for determining body language and baseline body language features of a human, a deep learning model can used. Such a deep learning model can be designed and trained to analyze the features over time, for instance using a time-series of even (part of) a movie.

For instance expressions such as stress and irritation can be detected by body language based on bodily features as well as facial features.

Hectic movements, as a sign of stress and irritation, are a bodily feature that can be detected by measuring an activity level.

Contracting the muscles on the forehead, as a sign of anger, dissatisfaction, and irritation, is a facial feature that can be detected by determining a contraction level of these muscles.

To detect bodily features, such as an activity level, the system in an embodiment can determine key points on the body (e.g. hands, shoulders, knees, etc.) of a human and measure the displacement of these key points over a (short) period of time. The initial activity level can set a baseline body language.

To detect the key points on the body of a human, in an embodiment the system comprises a model that is designed and trained for this detection. The training data to train the model comprises an annotation of various key points locations. When a new image is presented, the model allow identification of the locations of such key points. To this end, the system can utilize existing key point detection approaches such as MaskRCNN or CMU Part Affinity Fields. The training procedure and data can be customized to best match the context of the content of the retrieved images. Such context may comprise an outdoor context like streets, parks, parks with changing lighting conditions.

To measure movements over time, the system in an embodiment comprises a further model that is designed to take, as an input, a sequence of images with the predicted locations of key points and to output an activity level. In such an embodiment, the system computes sub-features such as temporal and spatial distances between the key points and an anchor (i.e. the head). The distances between all pairs of key points, the angles, the velocities, and the angular velocities are all examples of such sub-features. Subsequently, in this embodiment the system may comprise yet a further model, which is designed and trained to take the images, the predicted key points and the computed sub-features to predict an activity level of the human. The activity level can be measured by a continuous real number (regression) or assigned to a category.

To detect facial features, such as a contraction level, in an embodiment the system comprises yet a further model that is designed and trained to detect and localize muscles on the face. The initial contraction level of these muscles can set a baseline body language. An initial state can be computed by averaging the muscle contraction levels over several earlier retrieved images.

To detect the facial muscles, the system in an embodiment comprises yet a further model that is designed and trained for this. The training procedure uses data where the samples have annotations for the faces and the different muscles of the face. When a new image is presented, the model will identify the locations of such muscles and measure a contraction level (state of the muscles). The further model allows detection of the facial muscles for the subsequent images and compare with a baseline body language. The contraction level can be represented by various features such as Convolutional Neural Network (CNN) features.

In case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained with similar tasks to improve and speedup the training. Optimizing the weights of a model, in case of deep learning, can be done with the help of deep learning frameworks such as Tensorflow, Caffe, or MXNET. To train a model, optimization methods such as Adam or RMSProb can be used. Regression loss functions such Euclidean Loss can be used. Other approaches which use handcrafted features (such as LBP, SIFT, or HOG) and conventional classification methods (such as SVM or Random Forest) can be used.

Body language features, such an activity level and contraction level, can be further compared with a baseline body language using a distance function, such as L2, Manhattan, or Cosine distance. A comparison threshold can be set by an expert or learnt from a validation dataset. Based on this, the body language of a human can be further determined; for instance to determine the level of irritation.

Determining body language can also be computed by learning yet a further model comprising body language features and baseline body language as input.

An image or series of images or time series of images can for instance result from a LIDAR, a visual light camera, a sonar imaging, a radar imaging, a laser imaging, or an infrared camera.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1A:
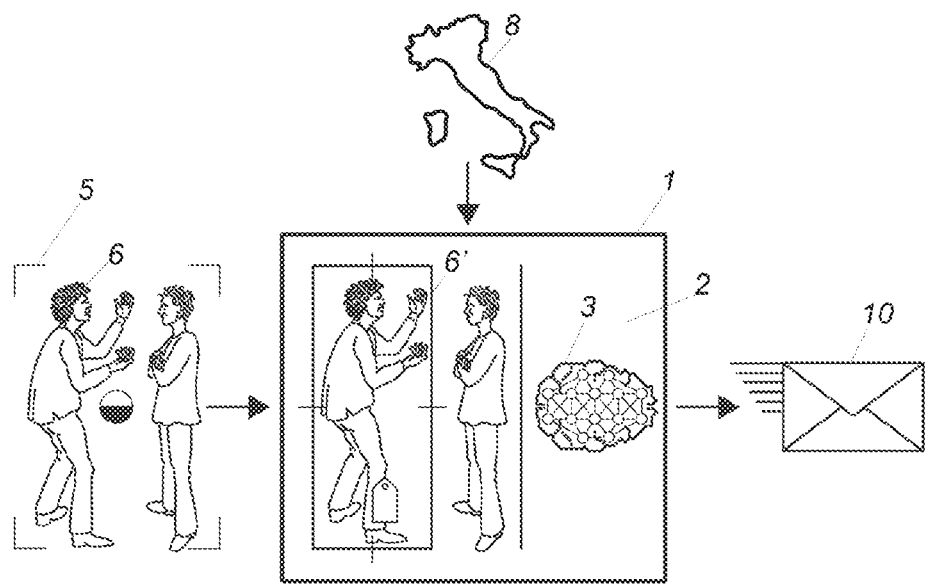
FIG. 1 schematically depicts an embodiment of an artificial intelligence (AI) system determining body language messages of two men with different baseline body language.
Figure 1B:
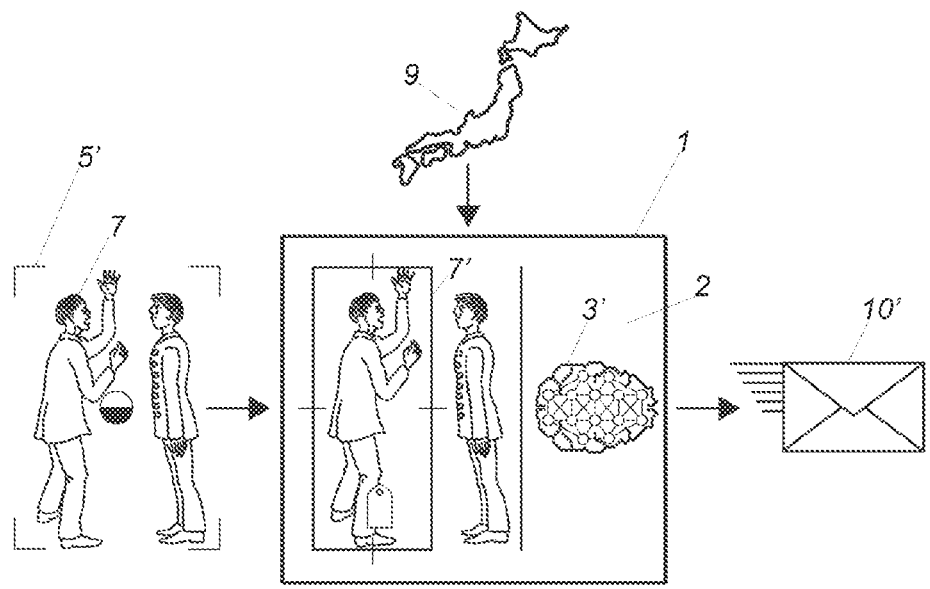

FIG. 1A-1B schematically depicts an embodiment of an AI system 1 running a computer program 2 comprising a trained machine learning model (3 and 3'), determining body language messages (10 and 10') of two men (6 and 7) from different cultures with different baseline body language (8 and 9).

In FIG. 1A, AI system 1 running computer program 2 retrieves an image 5 of a man 6 which results in a labeled man 6' showing body language. Computer program 2 determines—for instance by GPS coordinates, by an IP address, by the image setting and/or by a database entry—a baseline body language of an Italian culture 8. The trained machine learning model 3 adapted for the baseline body language of an Italian culture 8 categorizes the body language of labeled man 6' which results in a computer-processable body language message 10, messaging "a man talking normally". The moving arms while talking are matching the baseline body language of individuals belonging to a group of Italian culture with baseline body language 8 who are talking normally with moving arms.

In FIG. 1B, AI system 1 running computer program 2 retrieves an image 5' of a man 7 which results in a labeled man 7' showing body language. Computer program 2 determines—for instance by GPS coordinates, by an IP address, by the image setting and/or by a database entry—a baseline body language of a Japanese culture 9. The trained machine learning model 3' adapted for the baseline body language of a Japanese culture 9 categorizes the body language of labeled man 7' which results in a computer-processable body language message 10', messaging "an agitated man talking". The moving arms while talking are not matching the baseline body language of individuals belonging to a group of Japanese culture with baseline body language 9 who are talking normally without moving their arms. The moving of the arms is matching body language expressing agitation.

Figure 2A:
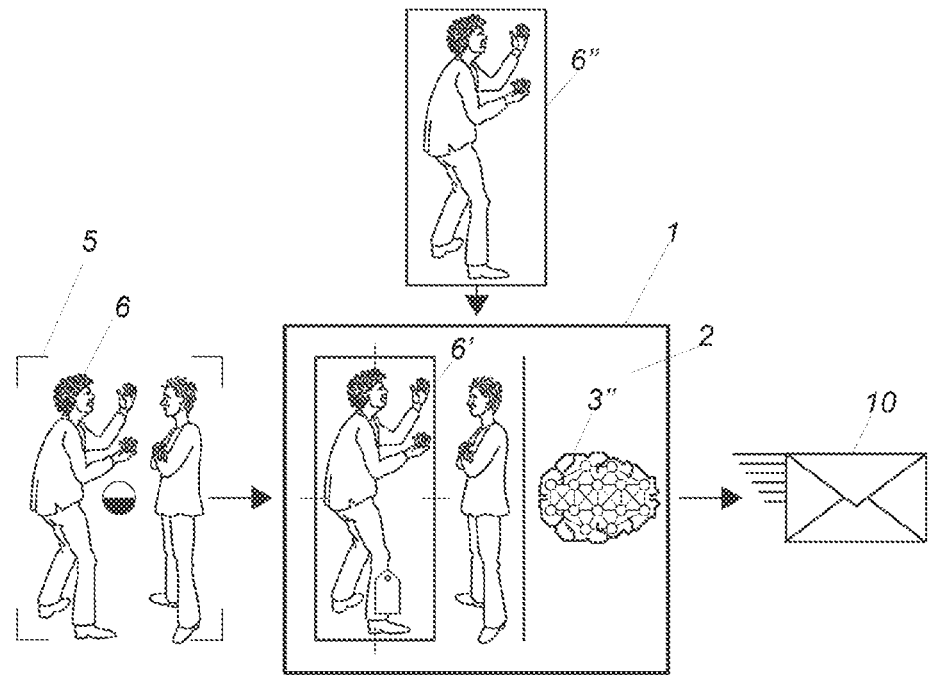
FIG. 2 schematically depicts an embodiment of an artificial intelligence (AI) system determining body language messages of two men with specific baseline body language.
Figure 2B:
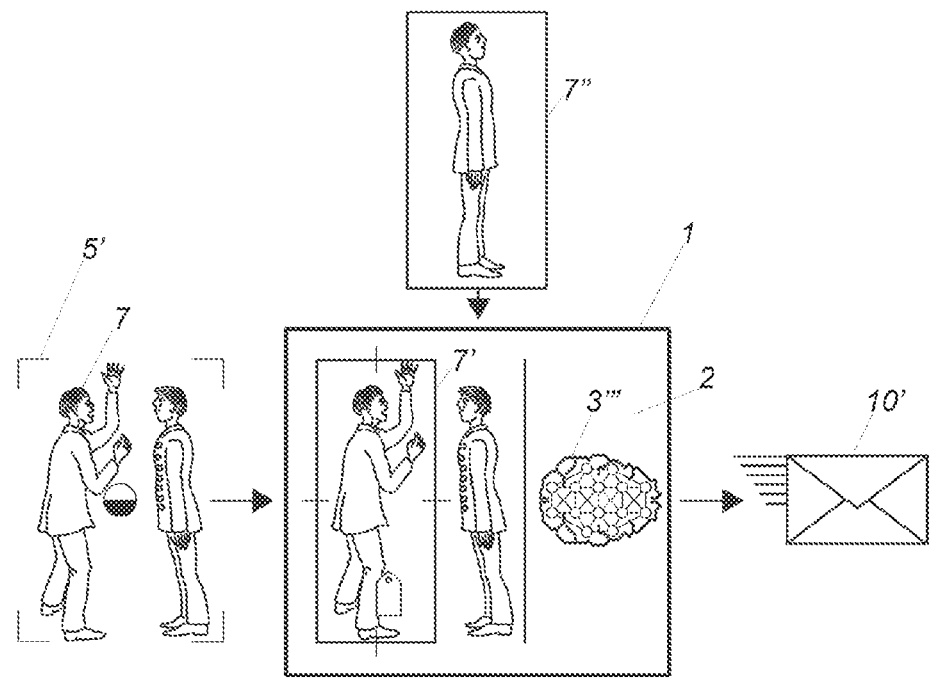

FIG. 2A-2B schematically depicts an embodiment of an AI system 1 running a computer program 2 comprising a trained machine learning model (3" and 3'''), determining body language messages (10 and 10') of two men (6 and 7) with specific baseline body language (6" and 7").

In FIG. 2A, AI system 1 running computer program 2 retrieves an image 5 of a man 6 which results in a labeled man 6' showing body language. Computer program 2 determines a baseline body language 6" of the man 6. The trained machine learning model 3" adapted for the baseline body language 6" categorizes the body language of labeled man 6' which results in a computer-processable body language message 10, messaging "a man talking normally" The moving arms while talking are matching the individual baseline body language 6" of man 6 who is talking normally while moving his arms.

In FIG. 2B, AI system 1 running computer program 2 retrieves an image 5' of a man 7 which results in a labeled man 7' showing body language. Computer program 2 determines a baseline body language 7" of the man 7. The trained machine learning model 3''' adapted for the baseline body language 7" categorizes the body language of labeled man 7' which results in a computer-processable body language message 10', messaging "an agitated man talking". The moving arms while talking are not matching the individual baseline body language 7" of man 7 who is talking normally without moving his arms. The moving of the arms is matching body language expressing agitation.

Figure 3:
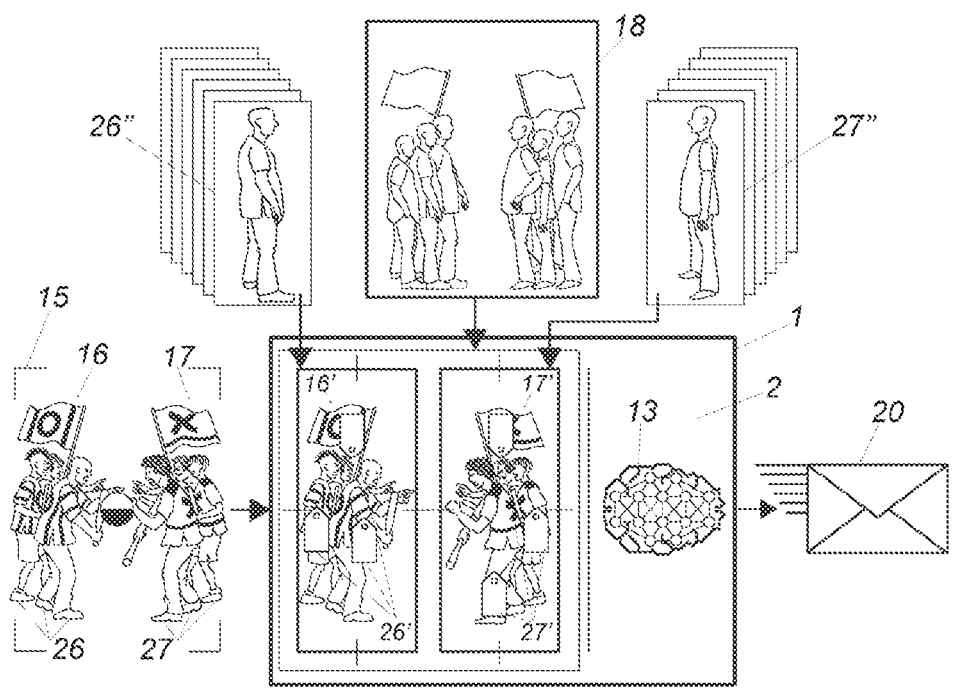
FIG. 3 schematically depicts an embodiment of an artificial intelligence (AI) system determining a body language message of two groups of football supporters having a social interaction with one another.

FIG. 3 schematically depicts an embodiment of an AI system 1 running a computer program 2 comprising a trained machine learning model 13, determining a body language message 20 of two groups (16 and 17) of football supporters (26 and 27) having a social interaction with one another. This may possibly indicate that a fight is about to take place.

AI system 1 running computer program 2 retrieves an image of football supporters 26 gathered in a first group 16 and further football supporters 27 gathered in a second group 17, which results respectively in first labeled football supporters 26', a first labeled group 16', second labeled football supporters 27' and a second labeled group 17'. The football supporters show body language. Computer program 2 determines a first common baseline body language 26" for the football supporters 26, a second common baseline body language 27" for the further football supporters 27 and a baseline body language 18 of a friendly encounter between football supporters. The trained machine learning model 13 adapted for the first common baseline body language 26" and second common baseline body language 27" categorizes the body language (26' and 27') of the two groups of labeled football supporters (16' and 17') which results in a computer-processable body language message 20, messaging "there is a tension between two social categories possibly indicating a fight is about to happen". The moving limbs, attributes (such as clubs, sticks, knives) and posture of the football supporters (26 and 27) are not matching the baseline body language 18 of a friendly encounter between football supporters. The moving limbs, attributes (such as clubs, sticks, knives) and posture of the football supporters (26 and 27) are matching body language expressing aggressive behavior and preparing for a fight.

Figure 4:
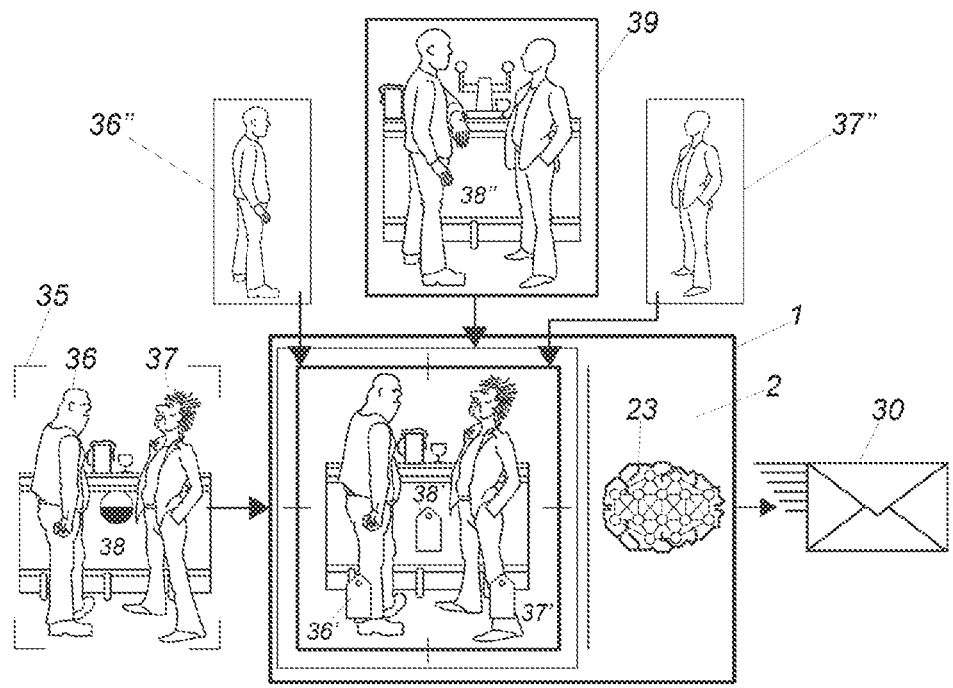
FIG. 4 schematically depicts an embodiment of an artificial intelligence (AI) system determining a body language message of two men having a social interaction with one another at a bar.

FIG. 4 schematically depicts an embodiment of an AI system 1 running a computer program 2 comprising a trained machine learning model 23, determining a body language message 30 of two men (36 and 37) at a bar 38 having a social interaction with one another indicating the two men (36 and 37) having an argument.

AI system 1 running computer program 2 retrieves an image of a first man 36, a second man 37 and a bar 38, which results respectively in a first labeled man 36', a second labeled man 37' and a labeled bar 38'. Computer program 2 determines a first common baseline body language 36" for the first man 36, a second common baseline body language 37" for the second man 37 and a baseline body language 39 of men talking in at a bar. The trained machine learning model 23 adapted for the first common baseline body language 36" and second common baseline body language 37" categorizes the body language of the two labeled men (36' and 37') which results in a computer-processable body language message 30, messaging "there is a tension between 2 social categories possibly indicating two men having an argument". The location at the bar 38 and body language of the two men (36 and 37) are matching a conversation. The leaning forward and closed first of the first man 36, and the arrogant looking second man 37 are not matching the baseline body language 39 of a calm and relaxed conversation between two men. The forwardly leaning and closed first of the first man 36, and the arrogant looking second man 37 are matching body language expressing a conversation between two men having an argument.

Figure 5A:
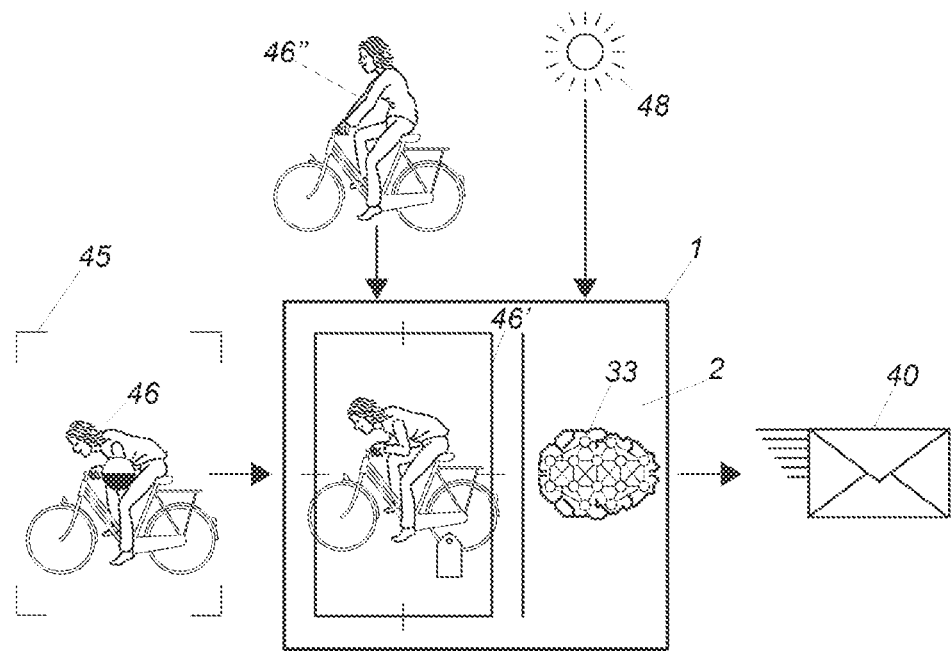
FIG. 5 schematically depicts an embodiment of an artificial intelligence (AI) system determining a body language message of a bicyclist.
Figure 5B:
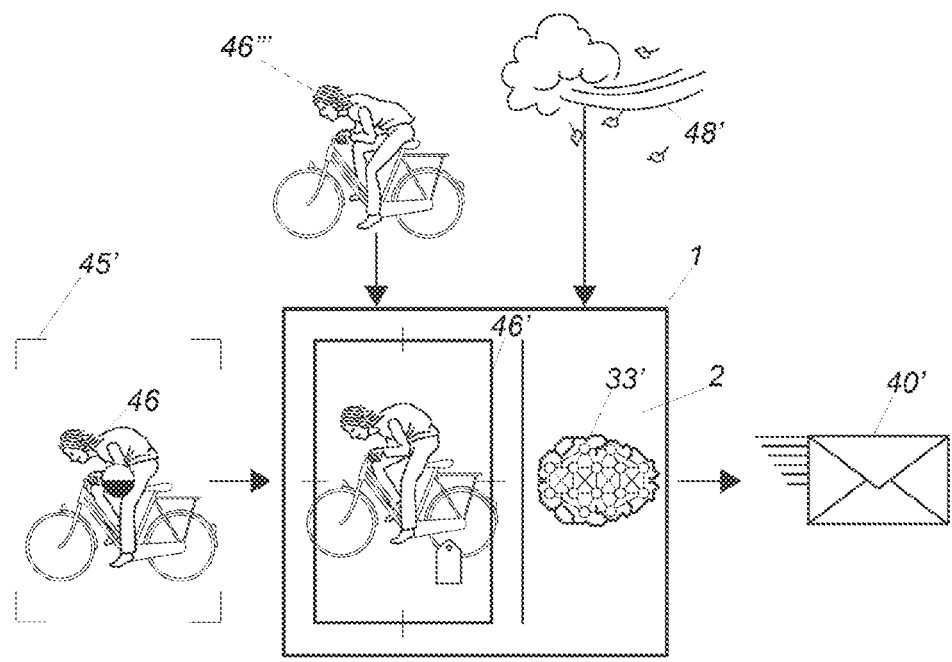

FIG. 5A-B schematically depicts an embodiment of an AI system 1 running a computer program 2 comprising a trained machine learning model (33 and 33'), determining body language messages (40 and 40') of a bicyclist 46 when bicycling in a context of different environments (48 and 48').

In FIG. 5A, AI system 1 running computer program 2 retrieves an image 45 of a bicyclist 46 which results in a labeled bicyclist 46' showing or displaying body language. Computer program 2 determines—for instance by GPS coordinates and data from a weather station, and/or by the image setting—the context 48 of a sunny environment without wind. The trained machine learning model 33 adapted for the baseline body language of a bicyclist 46" bicycling in the context 48 of a sunny environment without wind categorizes the body language of labeled bicyclist 46' which results in a computer-processable body language message 40, messaging "a bicyclist in a hurry". The forward bending of the bicyclist 46 is not matching the baseline body language 46" of a bicyclist bicycling in the context 48 of a sunny environment without wind. The forward bending of the bicyclist 46 is matching baseline body language expressing a bicyclist hurrying.

In FIG. 5B, AI system 1 running computer program 2 retrieves an image 45' of a bicyclist 46 which results in a labeled bicyclist 46' showing body language. Computer program 2 determines—for instance from GPS coordinates and from data from a weather station, and/or by the image setting—the context 48' of a stormy weather environment. The trained machine learning model 33' adapted for the baseline body language of a bicyclist 46'" bicycling in the context 48 of a stormy weather environment categorizes the body language of labeled bicyclist 46' which results in a computer-processable body language message 40', messaging "a bicyclist bicycling against the wind". The forward bending of the bicyclist 46 is matching the baseline body language 46'" of a bicyclist bicycling in the context 48' of a stormy weather environment.

Figure 6:
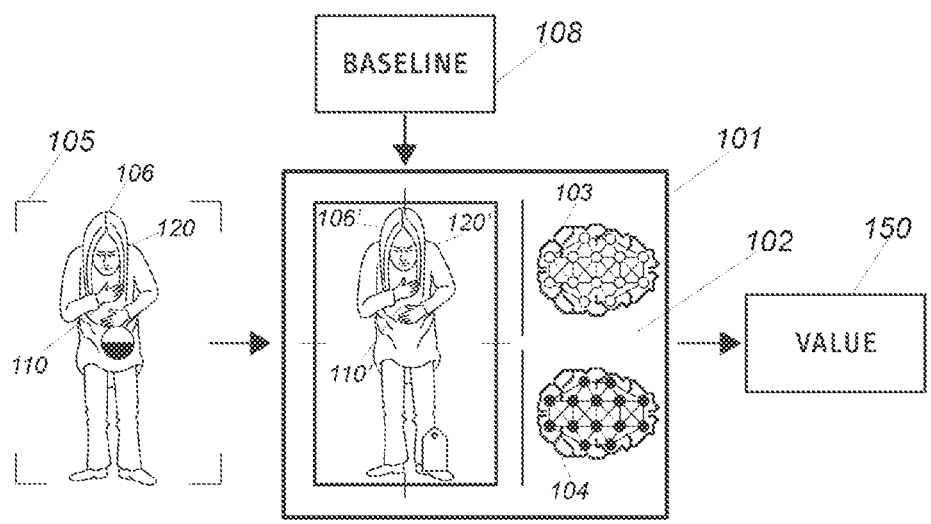
FIG. 6 schematically depicts an embodiment of a sign language transformation system validating a sign language message of a woman.

FIG. 6 schematically depicts an embodiment of a sign language transformation system 101 running a computer program 102 comprising a trained machine learning model 104, determining a sign language message 110, and a trained machine learning model 103, determining a body language message 120, for validating the sign language message 110 of a woman 106 into a value 150.

AI system 101 running computer program 102 retrieves an image 105 of a woman 106 which results in a labeled woman 106' showing sign language and body language. The trained machine learning model 104 categorizes the sign language of the labeled woman 106' by which the computer program 102 transforms the sign language 110 into a computer-processable sign language message 110' messaging "I am happy". The trained machine learning model 103 adapted for a baseline body language 108 categorizes the body language of the labeled woman 106' by which the computer program 102 transforms the body language 120, of the woman 106, in a computer-processable body language message 120' messaging "a sad woman" and validates the sign language message 110' by a value 150 indicating that the sign language 110 of the woman 106 contradicts the body language 120 of the woman 106.

Figure 7:
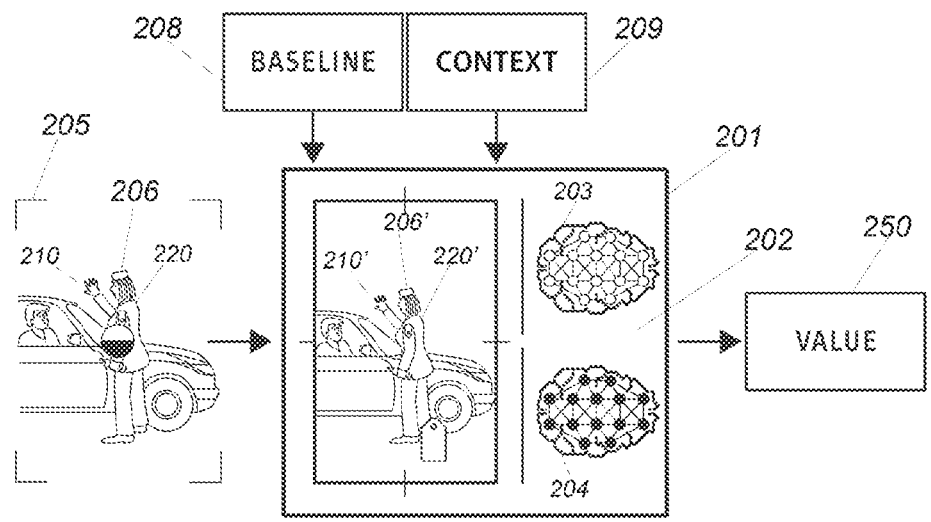
FIG. 7 schematically depicts an embodiment of a command gesture language transformation system validating a command gesture language message of a woman.

FIG. 7 schematically depicts an embodiment of a command gesture language transformation system 201 running a computer program 202 comprising a trained machine learning model 204, determining a command gesture language message 210, and a trained machine learning model 203, determining a body language message 220, for validating the command gesture language message 210 of a woman 206 into a value 150.

AI system 201 running computer program 202 retrieves an image 205 of a woman 206 which results in a labeled woman 206' showing command gesture language and body language. The trained machine learning model 204 categorizes the command gesture language of the labeled woman 206' by which the computer program 202 transforms the command gesture language 210 into a computer-processable command gesture language message 210' messaging a "Stop" command. The trained machine learning model 203 adapted for a baseline body language 208 and context 209 categorizes the body language of the labeled woman 206' by which the computer program 202 transforms the body language 220, of the woman 206, in a computer-processable body language message 220' messaging "hello" and validates the sign language message 210' by a value 250 indicating that the sign language 210 of the woman 106 in not supported the body language 220 of the woman 206.

Figure 8:
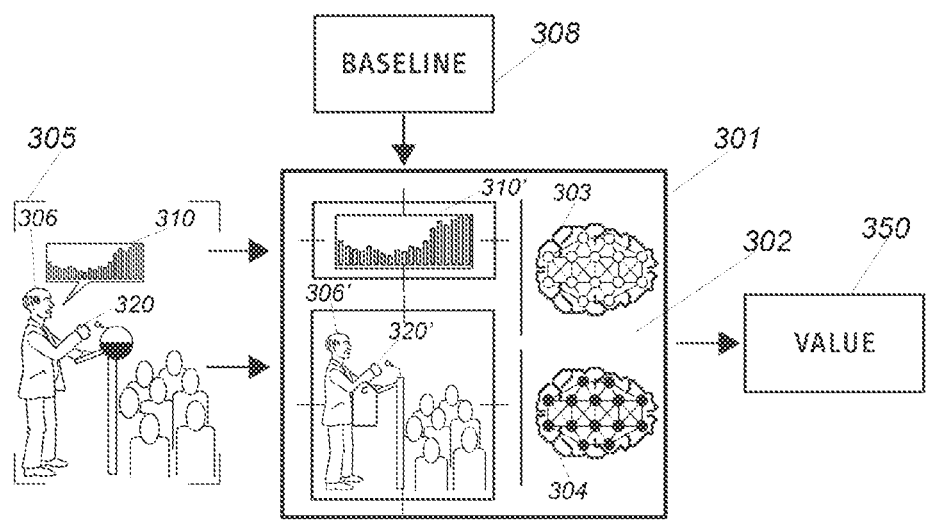
FIG. 8 schematically depicts an embodiment of a spoken-language transformation system validating a spoken-language message of a speaker.

FIG. 8 schematically depicts an embodiment of a spoken-language transformation system 301 running a computer program 302 comprising a trained machine learning model 304, determining a spoken-language message 310, and a trained machine learning model 303, determining a body language message 320, for validating the spoken-language message 310 of a speaker 306 into a value 350.

AI system 301 running computer program 302 retrieves an image 305 of a speaker 306 which results in a labeled speaker 306' expressing spoken-language and body language. The trained machine learning model 304 categorizes the spoken-language of the labeled speaker 106' by which the computer program 302 transforms the spoken-language 310 into a computer-processable spoken-language message 310' messaging the words spoken by speaker 106. The trained machine learning model 303 adapted for a baseline body language 308 categorizes the body language of the labeled speaker 306' by which the computer program 302 transforms the body language 320, of the speaker 306, in a computer-processable body language message 320' messaging "a self-assured man" and validates the spoken-language message 310' by a value 350 indicating that the spoken-language 310 of the speaker 306 is supported by the body language 320 of the speaker 306.

Figure 9:
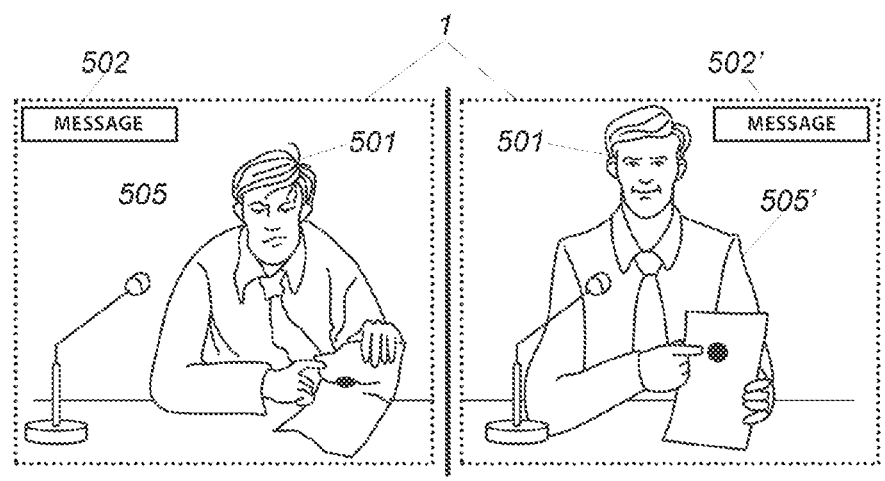
FIG. 9 schematically depicts an embodiment of a video conference system analyzing body language.

FIG. 9 schematically depicts an embodiment of a video conference AI system 1 which is installed on a private computer and attached to a webcam. The video conference AI system 1 analyzes body language (505 and 505') of user 501 and provides coaching feedback through messages 502 and 502'. In the left view, user 501 with body language 505 is participating in a job interview and is instructed by message 502 "sit up straight so you make a more self-certain impression". In the right view, user 501 changed his posture and shows the body language 505', and message 502' provides feedback "you're doing well now".

A video conference AI system 1 is useful in many other video conferencing situations, such as during a first date or while giving a presentation. A video conference AI system 1 can also analyze the body language of other participants of the video conference and give feedback about this to user 501. The feedback can be provided in various ways such as by a written message, a spoken message, a sound, a moving body wearable, a punch, a light (flickering, color) and any other visual sign.

Another application of a video conference AI system 1 is to act as a coach for a user preparing a presentation. Feedback could comprise messages such as "don't wiggle so much, so you radiate more confidence," or "show a bit more livelihood, you currently sit and act like a robot and make a cold impression."

Figure 10:
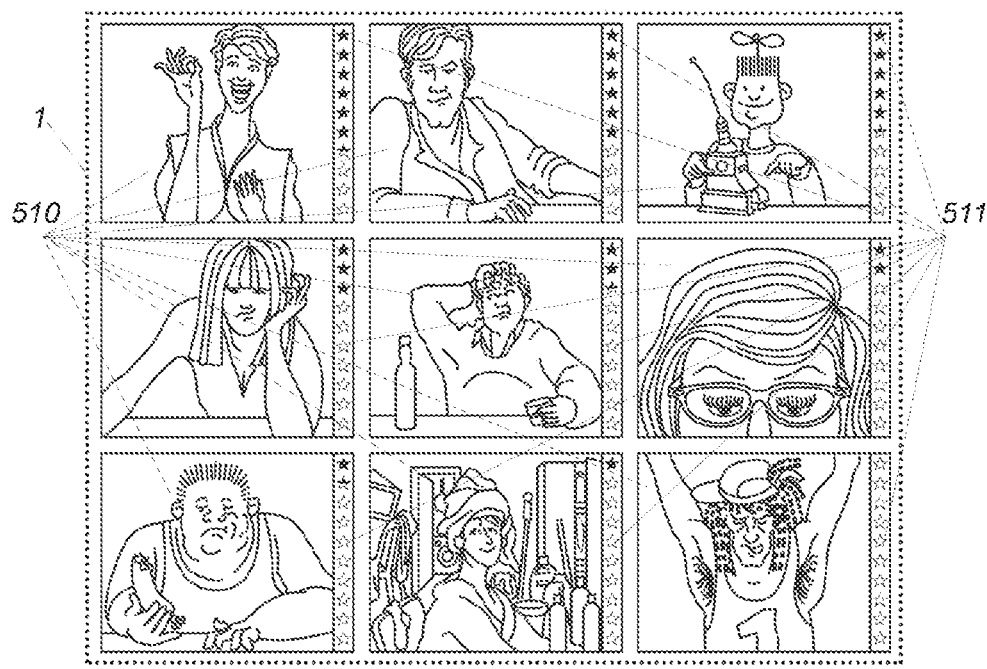
FIG. 10 schematically depicts an embodiment of a video analyzer, on a cloud server of a social media network, analyzing body language.

FIG. 10 schematically depicts an embodiment of a video analyzer AI system 1 which is for instance installed on a cloud server of a social media network, and where a large series of people are broadcasting video streams 510. The video analyzer AI system 1 analyzes the context and body language of the people in the video streams 510, and assigns one or more scores to each video stream 510. Such scores validate a video stream 510 based upon features such as the livelihood of the people, the openness of the people, the attractiveness of the people, how bored the people seem, how defensive or aggressive the people seem, how patient or impatient the people seem, how stupid or smart the people seem, how dull or funny the people seem, how messy or tidy the room is and the styling of the room. The video analyzer AI system 1 for example summarizes multiple scores in a single rating 511 per video. The rating 511 is used, automated or manual by operators, to rank the most interesting video streams 511 first.

In another embodiment a video analyzer AI system 1 analyzes the context and the body language of people in video streams coming from surveillance cameras, and scores the level of potential criminal activity.

In a further embodiment a video analyzer AI system 1 analyzes the body language of students in video streams coming from individual webcams during a online lecture. The scores provide feedback for the lecturer such as "Do I keep my audience interested?" With the help of automated rankings the lecturer can even, when the audience is numerous, give attention to individual students; for instance using a ranking based on body language showing or indicating a lack of understanding the subject.

Figure 11:
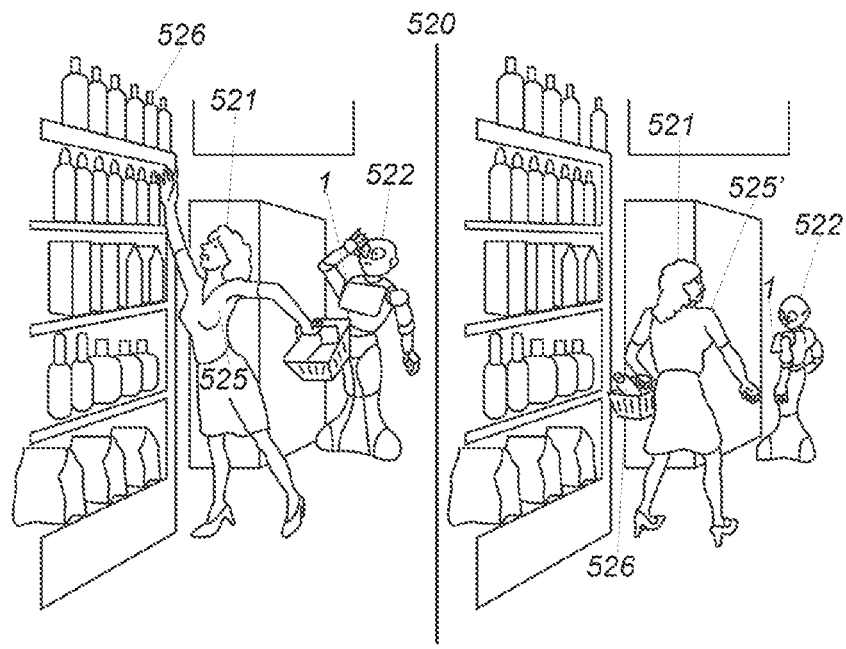
FIG. 11 schematically depicts an embodiment of a service robot in a supermarket analyzing body language.

FIG. 11 schematically depicts an embodiment of a video analyzer AI system 1 in a service robot 522 with a video system that is designed to interact with a woman 521 in a supermarket 520. Here, the video analyzer AI system 1 analyzes the body language 525 of the woman 521 to determine if the woman seems irritated or needs help. In the left view, the video analyzer AI system 1 detects, due to her body language 525, that the woman 521 appears to need help. The service robot 522 then approaches the woman 521, and asks if there is anything the service robot 522 can do to help the woman 521 with. Such help can for instance comprise grabbing the product 526 she is reaching for. Alternatively, as depicted in the right view, the service robot 522 senses, due to her body language 525', that its interaction with the woman 521 causes the woman 521 to get irritated. The service robot 522 then for instance apologizes and moves out of the way of the woman 521. In a further embodiment of such a video analyzer AI system 1 in a service robot 522 with a video system, the service robot 522 operates as a trainer robot. The trainer robot interacts for instance with an animal to train that animal, for instance train a dog. The trainer robot in such an embodiment can detect body language of the animal and take actions to correct behavior of the animal.

Figure 12:
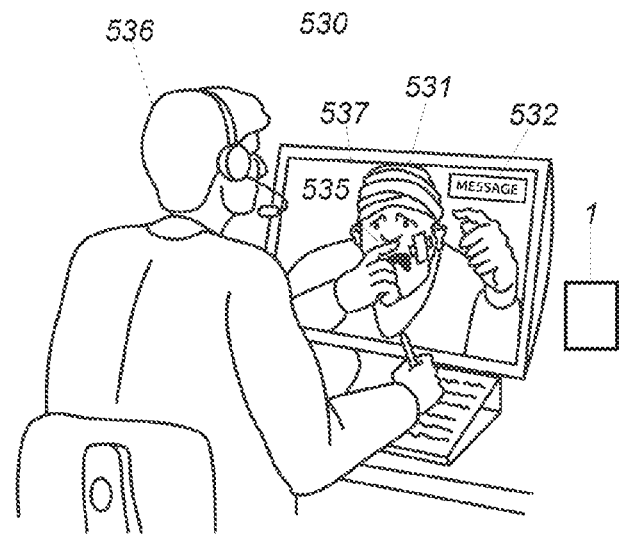
FIG. 12 schematically depicts an embodiment of a video chat service application, utilized a customer services, analyzing body language.

FIG. 12 schematically depicts an embodiment of a video analyzer AI system 1 in a video chat service application and installed on a call center system of a call center 530 servicing a customer services department of an insurance company. The video analyzer AI system 1 provides analysis of the body language 535 of a customer 531 to help an operator 536 better interpret for instance the faithfulness of a customer 531. The body language 535 of the customer 531 shows "nose touching" and may demonstrate that the customer 531 is being untruthful about what he is saying. As a result of an analysis by the video analyzer AI system 1, in an embodiment a message 532 appears on a display 537 of the call center system, warning the operator 536 and instructing the operator 536 to verify and to drill down more into what the customer 531 is describing.

Figure 13:
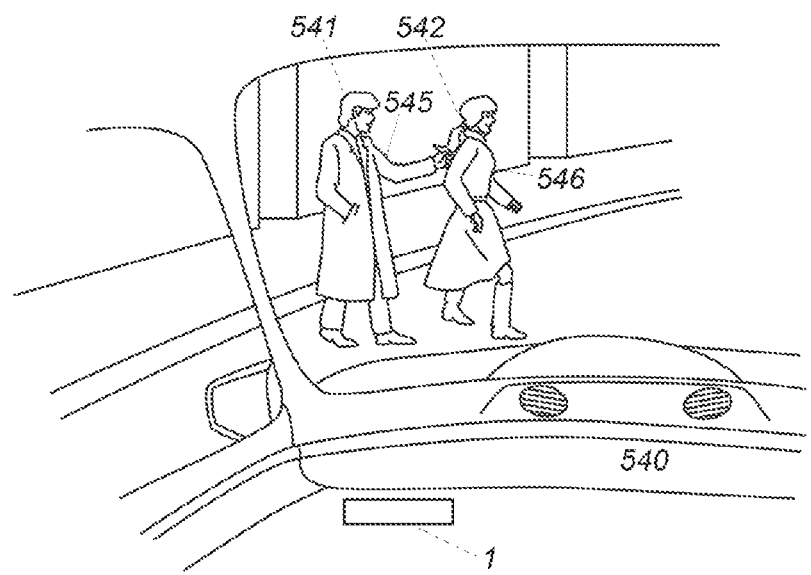
FIG. 13 schematically depicts an embodiment of a self-driving car analyzing body language.

FIG. 13 schematically depicts an embodiment of a video analyzer AI system 1 operationally coupled to a camera system of a self-driving car 540. The video analyzer AI system 1 receives images from the camera system of the self-driving car 540, and detects a man 541 and his body language 545 showing a slightly touch of the upper arm of a woman 542 in front of the self-driving car 540. The video analyzer AI system 1 infers from the body language 545 of the man 541 that the man 541 has positive and encouraging feelings for the woman 542, and that the man 541 and woman 542 likely belong together or have some sort of relationship with each other. The self-driving car 540 is instructed to steer around the man 541 and woman 542, and not initiate a steering movement that would require the man 541 and woman 542 to split up.

Figure 14:
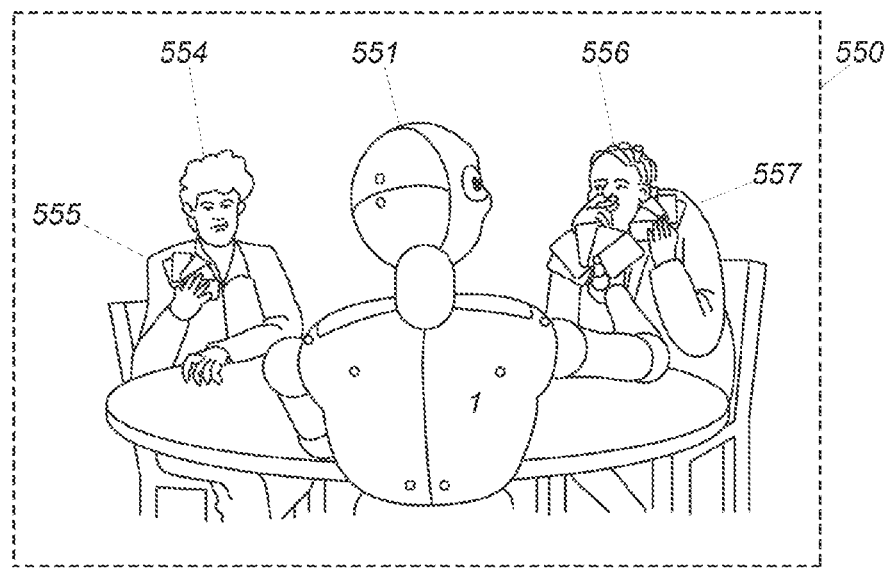
FIG. 14 schematically depicts an embodiment of a computer robot playing poker on a video-driven poker platform analyzing body language.
Figure 16:
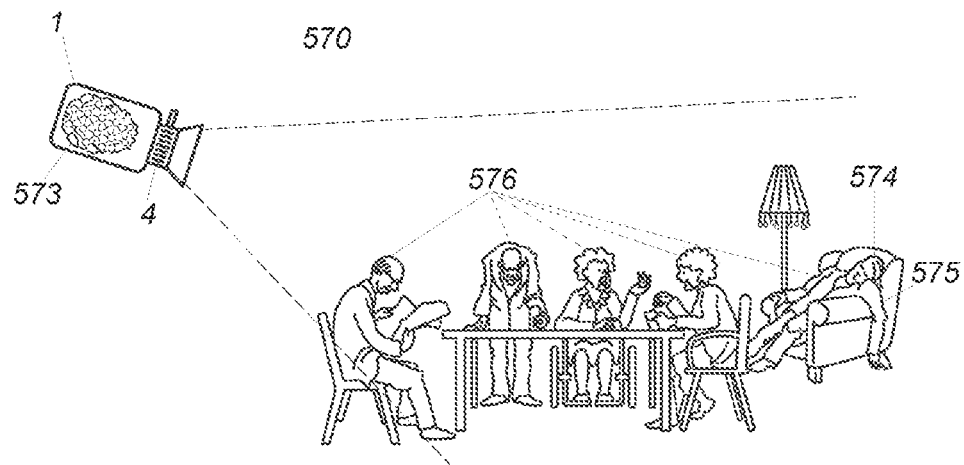
FIG. 16 schematically depicts an embodiment of a surveillance system in a elderly care center, and FIG. 17 schematically depicts an embodiment of a surveillance system in a fast food restaurant.

FIG. 14 schematically depicts an embodiment of a video analyzer AI system 1 in a computer robot 551 playing poker on a video-driven poker platform 550 with 2 other players (554 and 556). For each player (554 and 556), the computer robot 551 builds up a baseline of body language exhibited by that player when holding good cards and when holding poor cards. Once a baseline is built up, the computer robot 551 can estimate the quality of the cards during a game by analyzing the body language. In FIG. 16. the computer robot 551 estimates the quality of the cards of the player 554 by comparing the body language 555 of the player 554 with the baseline of body language built up by computer robot 551 for the player 554. Likewise, the computer robot 551 estimates the quality of the cards of the player 556 by comparing the body language 557 of the player 556 with the baseline of body language built up by computer robot 551 for the player 556. The computer robot 551 utilizes the estimations of the quality of the cards of the players (554 and 556) to improve its odds to win the poker game.

Figure 15:
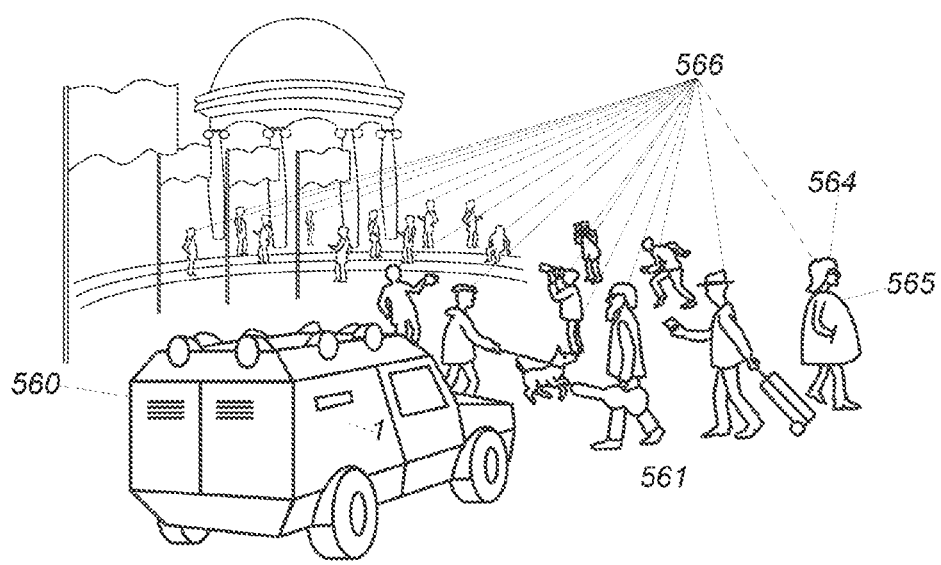
FIG. 15 schematically depicts an embodiment of a surveillance system in a military vehicle.

FIG. 15 schematically depicts an embodiment of a video analyzer AI system 1 as part of a surveillance system and operationally coupled to a camera system of a military vehicle 560 driving on a historical square 561. The video analyzer AI system 1 receives images from the camera system of the military vehicle 560, and analyses the body language of each pedestrian 566, which can be as simple as detecting a different way of moving the arms along the body while walking. The video analyzer AI system 1 detects a woman 564 with body language 565 and infers that the woman may be wearing a bomb vest. In a further embodiment of such a video analyzer AI system 1 as part of a surveillance system and operationally coupled to a camera system, the video analyzer AI system 1 can analyze behavior of animals and detect an animal which displays awkward or (future) dangerous behavior towards humans or other animals, indicative of for instance future violence. This relates for instance to animals that can potentially be dangerous to humans, for instance to infants. These potentially dangerous animals are for example dogs, or wild animals.

FIG. 16 schematically depicts an embodiment of a video analyzer AI system 1 integrated in a video camera 4 as part of a surveillance system in an elderly care center 570. In a further embodiment a video analyzer AI system 1 integrated in a video camera 4 as part of a surveillance system can be used to monitor live stock (such as cows, horses, chickens) or to monitor domesticated animals (such as cats, dogs). The video analyzer AI system 1, comprising a trained machine learning model 573, can determine a baseline body language of the inhabitants 576 while they feel comfortable and at ease. Upon detecting a significant change in the body language of one or more inhabitants 576, compared to a baseline body language, and indicating a need for assistance, the system alerts a care worker. In FIG. 18. the inhabitant 574 shows the body language 575 which may indicate this inhabitant needs medical care. While with traditional human 24/7 monitoring system the privacy of inhabitants of an elderly care center is constantly violated, with a video analyzer AI system 1 the privacy of the inhabitants 576 is mostly preserved and is only be violated when there is a need for it.

Figure 17:
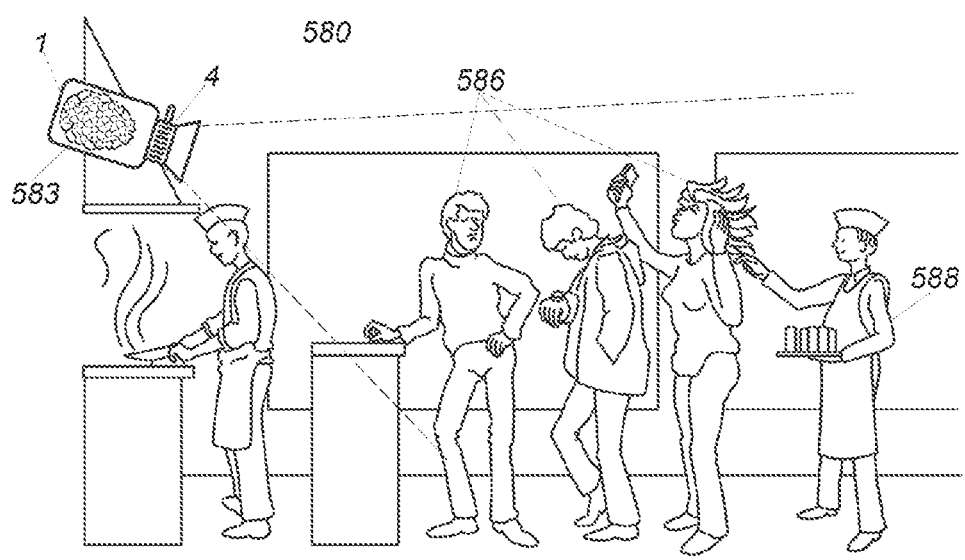

FIG. 17 schematically depicts an embodiment of a video analyzer AI system 1 integrated in a video camera 4 as part of a surveillance system, here in a fast food restaurant 580. The video analyzer AI system 1, comprising a trained machine learning model 583, can determine when there is a line of impatient clients 586 showing body language by (excessive) signals of impatience, and can warn a manager 588 to have a chat with the impatient clients 586 and offer them a drink to ease the inconvenience. In another embodiment the video analyzer AI system 1 can also determine a baseline body language of the waiting clientele when business is quiet as well as a baseline body language when business is busy, and by comparing an actual waiting line with the baseline body language when business is busy, and by comparing the actual waiting line with the baseline body language when business is quiet, the video analyzer AI system 1 can infer if the actual waiting line needs attention.

For instance, video analyzer AI system 1 records the baseline body language for each identified client 586 in the restaurant 580. The baseline body language recording period starts from identifying a client 586 and lasts for a short period (e.g. 30 seconds). Video analyzer AI system 1 monitors the changes of facial and bodily features for each detected and identified client 586. Video analyzer AI system 1 keeps monitoring the clients 586 while they are waiting and detects a level of irritation by comparing facial and bodily features of their body language to their recorded baseline body language.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A body language system for determining a body language message of a living being in a context, said system comprising an artificial intelligence (AI) system, said AI system running a computer program that:
- retrieves at least one image of said living being showing body language;
- labels said living being in said at least one image, resulting in a labeled living being;
- determines said context from said at least one image using a first trained machine learning model;
- determines a baseline body language of said labeled living being from said at least one image using the first or a second trained machine learning model;
- adapts the first or the second trained machine learning model of said AI system using said baseline body language and said context to form an adapted trained machine learning model;
- applies the adapted trained machine learning model of said AI system to at least one of said at least one image for categorizing said body language resulting in a category, and applying said category for determining said body language message.

2. The system of claim 1. wherein said computer program retrieves said at least one image of said living being, and wherein said body language comprises a body language pose.

3. The system of claim 1, wherein said computer program retrieves a plurality of images of said living being, and wherein said body language comprises a body language gesture, in particular said plurality of images is part of a time series of images and wherein said at least one image is part of a time series of images.

4. The system of claim 1, wherein after said adapting, said AI system is applied to further retrieved images of said living being.

5. The system of claim 1, wherein determining said body language message of a living being occurs functionally in real-time.

6. The system of claim 1, wherein said body language message is determined within a probability range.

7. The system of claim 1, wherein determining said baseline body language comprises determining body language characteristics which are specific for a group of living beings including said identified living being and retrieving information regarding said labeled living being, said information comprising at least one selected from species, culture, race, religion, appearance, state of mental health, state of physical health, and age group, and wherein said retrieving information for said baseline body language regarding said labeled living being comprises categorizing said body language from said retrieved at least one image.

8. The system of claim 1, wherein said determining said baseline body language comprises determining body language details that are specific for said labeled living being.

9. The system of claim 3, wherein the labeled living being is a labeled living being with respect to the at least one image and wherein the category is a category with respect to the at least one image and wherein said determining said baseline body language that are specific for said labeled living being comprises said computer program:
- retrieving at least one further image of said living being showing body language;
- labeling said living being in said at least one further image, resulting in a labeled living being with respect to the further image;
- applying said AI system to said at least one further image for categorizing the body language of said labeled living being resulting in a category with respect to the further image, and applying said category with respect to the further image to determine a baseline body language message with respect to the further image.

10. The system of claim 1, wherein said at least one image comprises a plurality of living beings each showing said body language, and said computer program labeling at least part of said living beings in said at least one image, determining a common baseline body language of said labeled living beings, adapting said AI system using said common baseline body language and further comprising using said common baseline body language for grouping said labeled living beings.

11. The system of claim 1, wherein said context is an environment in which the living being is positioned, in particular wherein said environment comprises at least one of a location, an event, an object, another living being, weather conditions, light conditions, road conditions, and a combination thereof.

12. The body language system of claim 1, the AI system further running a sign language computer program for retrieving at least one image of said living being showing sign language and applying said AI system to transform said sign language into said sign language message, said computer program of said body language system determining a body language message from said at least one image for validating said sign language message.

13. The body language system of claim 12, wherein said validating comprises comparing said sign language message with said body language message and outputting a machine-processable result indicating either said body language message emphasizes said sign language, or said body language message de-emphasizes said sign language, or said body language message differs from said sign language message.

14. The body language system of claim 12, wherein:
- said sign language computer program determining said sign language message within a probability range;
- said body language system determining said body language message within a further probability range, and wherein said validating comprises comparing said probability range with said further probability range.

15. The body language system of claim 1, the AI system further running a command gesture language computer program for retrieving at least one image of said living being showing command gesture language and applying said AI system for transforming said command gesture language into said command gesture language message, said computer program of said body language system determining a body language message from said at least one image for validating said command gesture language message.

16. The body language system of claim 15, wherein said validating comprises comparing said command gesture language message with said body language message and outputting a machine-processable result indicating either said body language message emphasizes said command gesture language, or said body language message de- emphasizes said command gesture language, or said body language message differs from said command gesture language message.

17. The body language system of claim 15, wherein:
- said command gesture language computer program determining said command gesture language message within a probability range;
- said command gesture language computer program of said body language system determining said body language message within a further probability range, and
- wherein said validating comprises comparing said probability range with said further probability range.

18. The body language system of claim 1, the AI system further running a spoken-language computer program for retrieving a spoken-language recording of said labeled living being and applying said AI system to transform said spoken-language recording into said spoken-language message, wherein said at least one image is time-synchronized with said spoken-language recording, and said computer program of said body language system determining a body language message from said at least one image for validating said spoken-language message.

19. The body language system of claim 18, wherein said validating comprises comparing said spoken-language message with said body language message and outputs a machine-processable result indicating either said body language message emphasizes said spoken-language, or said body language message de-emphasizes said spoken-language, or said body language message differs from said spoken-language message.

20. The body language system of claim 18, wherein:
said spoken-language computer program determines said spoken-language message within a probability range;
said spoken-language computer program of said body language system determines said body language message within a further probability range, and
wherein said validating comprises comparing said probability range with said further probability range.

21. One or more non-transitory computer-readable media comprising instructions that cause a computer device, in response to execution of the instructions by a processor of the computer device, to cause an AI system to:
retrieve at least one image of said living being showing body language;
label said living being in said at least one image, resulting in a labeled living being;
determine said context from said at least one image using a first trained machine learning model;
determine a baseline body language of said labeled living being from said at least one image using the first or a second trained machine learning model;
adapt the first or the second trained machine learning model of said AI system using said baseline body language and said context to form an adapted trained machine learning model; apply the adapted trained machine learning model of said AI system to at least one of said at least one image to categorize said body language in a category, and apply said category to determine said body language message.

* * * * *